United States Patent [19]  
Monks

[11] 4,014,413  
[45] Mar. 29, 1977

[54] BRAKES FOR VEHICLES

[75] Inventor: Harry Monks, Burton-on-Trent, England

[73] Assignee: Coal Industry (Patents) Limited, London, England

[22] Filed: May 16, 1975

[21] Appl. No.: 578,028

[30] Foreign Application Priority Data

June 21, 1974 United Kingdom ............. 27729/74

[52] U.S. Cl. .................................. 188/170; 188/44
[51] Int. Cl.² ........................................ B60T 13/10
[58] Field of Search ............ 188/43, 44, 72.2, 136, 188/170

[56] References Cited

UNITED STATES PATENTS

| 2,970,445 | 2/1961 | Suderow | 188/44 X |
| 3,486,592 | 12/1969 | Kolk et al. | 188/44 X |
| 3,635,315 | 1/1972 | Shalders | 188/44 X |
| 3,741,349 | 6/1973 | Banks | 188/44 X |

Primary Examiner—Duane A. Reger  
Attorney, Agent, or Firm—James C. Wray

[57] ABSTRACT

A brake of a mining machine arranged for braking contact with an anchored rail arranged along the path of the machine includes a wedge assembly having a brake member which upon contacting the rail is urged by relative movement of the wedge components in the wedge assembly to increase the braking force of the brake equipment on the rail.

15 Claims, 4 Drawing Figures

BRAKES FOR VEHICLES

This invention is an improvement in or a modification of the invention described and claimed in our U.S. Pat. No. 1,342,718.

There is claimed in the above numbered patent specification brake equipment for a vehicle, including a brake shoe, resilient means for applying the brake shoe and fluid actuated means for releasing the brake shoe to resist or permit motion of the vehicle, respectively, valve means which move between an operating position and a non-operating or closed position to control the supply of pressure fluid to the fluid actuated means, the operating and the non-operating or closed positions being associated with brake release and brake application, respectively, the valve means being biased towards the non-operating or closed position, and control means which move between an operating position and a non-operating position to control the operation of the valve means and which, in use, are sensitive to the tractive force on the vehicle, the control means being biased towards the non-operating position in which the valve means is allowed to move to its non-operating or closed position, the arrangement being such that in operation the control means controls the operations of the valve means in accordance with the sensed tractive force so that the brake shoe is applied when the tractive force is a preselected valve.

An object of the present invention is to provide improved brake equipment.

According to the present invention, brake equipment for a vehicle which in use moves along a path adjacent to an anchored rail comprises a number of co-acting brake shoes slidable along the rail, resilient means for urging at least one of the brake shoes into contact with the rail and fluid actuated means for urging the said brake shoe out of braking contact with the rail, at least one of the brake shoes including a wedge assembly having a brake pad which upon contacting the rail is urged by relative movement of wedge components in the wedge assembly to increase the braking force of the brake equipment on the rail.

Preferably, one of said wedge components is resiliently mounted with respect to the remainder of the shoe assembly.

One preferred embodiment of the present invention will be described with reference to the accompanying drawings, in which.

Figure 1:
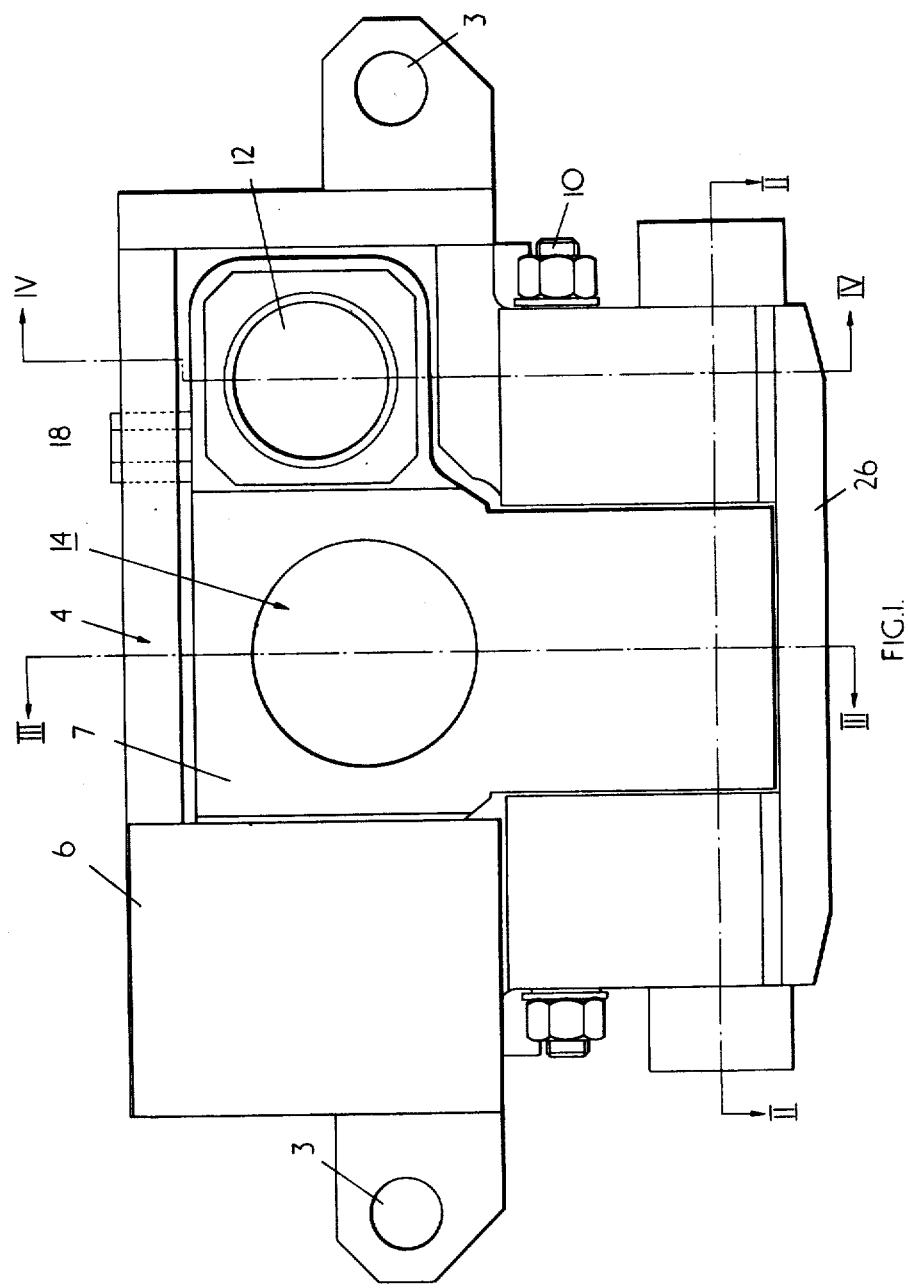
FIG. 1 is a side elevation of brake equipment constructed in accordance with the present invention.

Referring to the drawings, which show safety brake equipment for a mineral mining machine (not shown) which in operation wins mineral by repeatedly traversing back and forth along an armoured conveyor extending along an inclined longwall face. As the machine traverses along the conveyor by hauling itself along a flexible chain, the brake equipment, which is fixedly attached to the machine, moves back and forth along a series of elongated members connected end to end.

Each member is formed by a plate 2, one end of which is bent over to form a cylindrical tube. The other end of the plate 2, which is not shown, is connected to the armoured conveyor.

The brake equipment comprises a casing 4 which bridges the member and which has bolt holes 3 enabling the brake equipment to be attached to the machine. A part of one side of the casing 4 constitutes a part of one jaw 5 of a clamp which is adapted to contact the plate 2 and which includes a wedge brake pad 21.

The opposite side of the casing 4 is partially closed by two plates 6 (only one of which is shown in FIG. 1) rigidly bolted to the casing 4 and by a component 7 which is 'T' shaped as viewed in FIG. 1 and which has its upright limb extending between the two plates 6 towards the base of the casing 4 to form the other jaw 8 of the clamp. The jaw 8 has a curved surface 9 corresponding to the cylindrical tube 3.

The two cross limbs of the 'T' shaped component 7 lie within the casing 4 adjacent to the two plates 6, respectively.

The component 7 which is pivotally mounted on a pivot bolt 10 supported at its ends by the casing 4, has two blind bores which form the cylinders of two rams 12, and has a further blind bore housing disc springs 14.

The springs 14 act to urge the wedge brake pad 21 and the jaw 8 of the clamp to grip the elongated member and are retained within the bores by a bolt 16 which can be adjusted to vary the clamping thrust applied by the brake equipment 8, 21.

The rams 12 extend from the component 7 and abut the plates 6 so that when energised the rams 12 urge the component 7 to pivot about the bolt 10 against the action of the springs 14 to release the jaws of the clamp from the elongated member. The energising pressure fluid for the rams 12 is supplied through a hole 18 in the casing 4 to an inlet and a blind bore (not shown) extending along the cross limbs of the component 7.

The bridging parts of the casing 4 are formed so that the casing 4 contacts the curved upper surface of the tube and the plain downwardly extending surface of the plate 2. Plates 26 secured to the base of the casing 4 ensure that the brake equipment is captivated to the member.

Some parts of the casing 4, of the component 7 and of the plates 26 which are adjacent to the elongated member are chamfered to assist the brake equipment in negotiating joints between adjacent elongated members.

Figure 2:
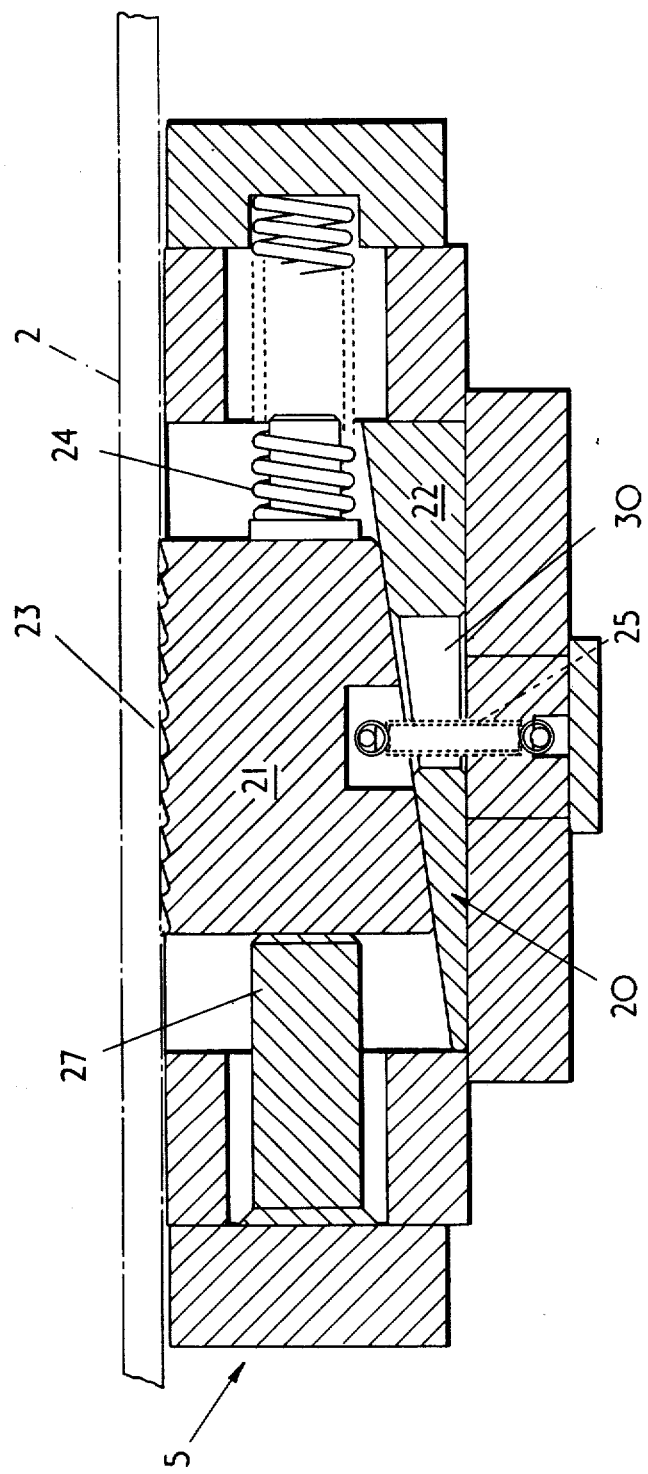
FIG. 2 is a section along line II—II of FIG. 1.
Figure 3:
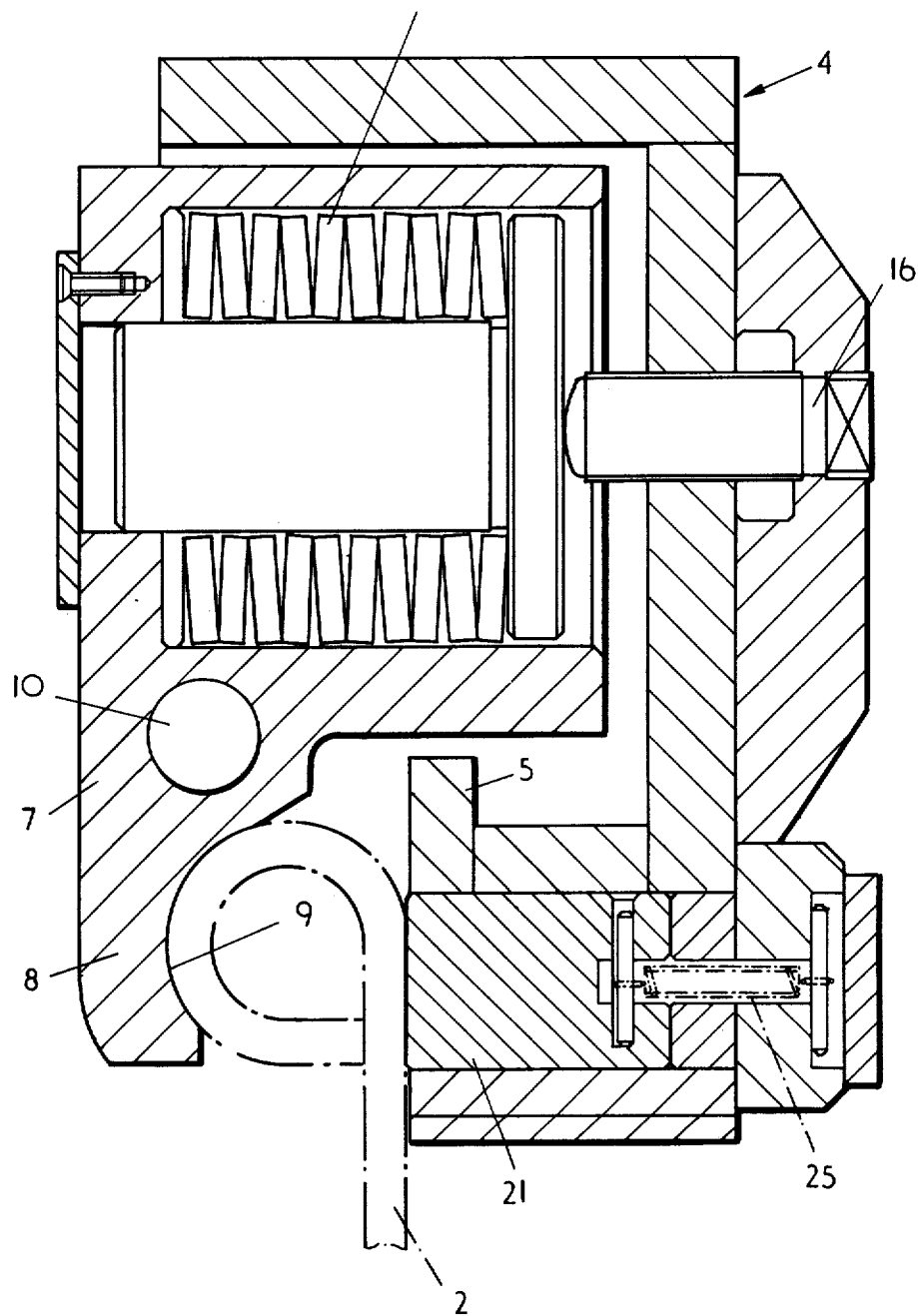
FIG. 3 is a section along line III—III of FIG. 1.
Figure 4:
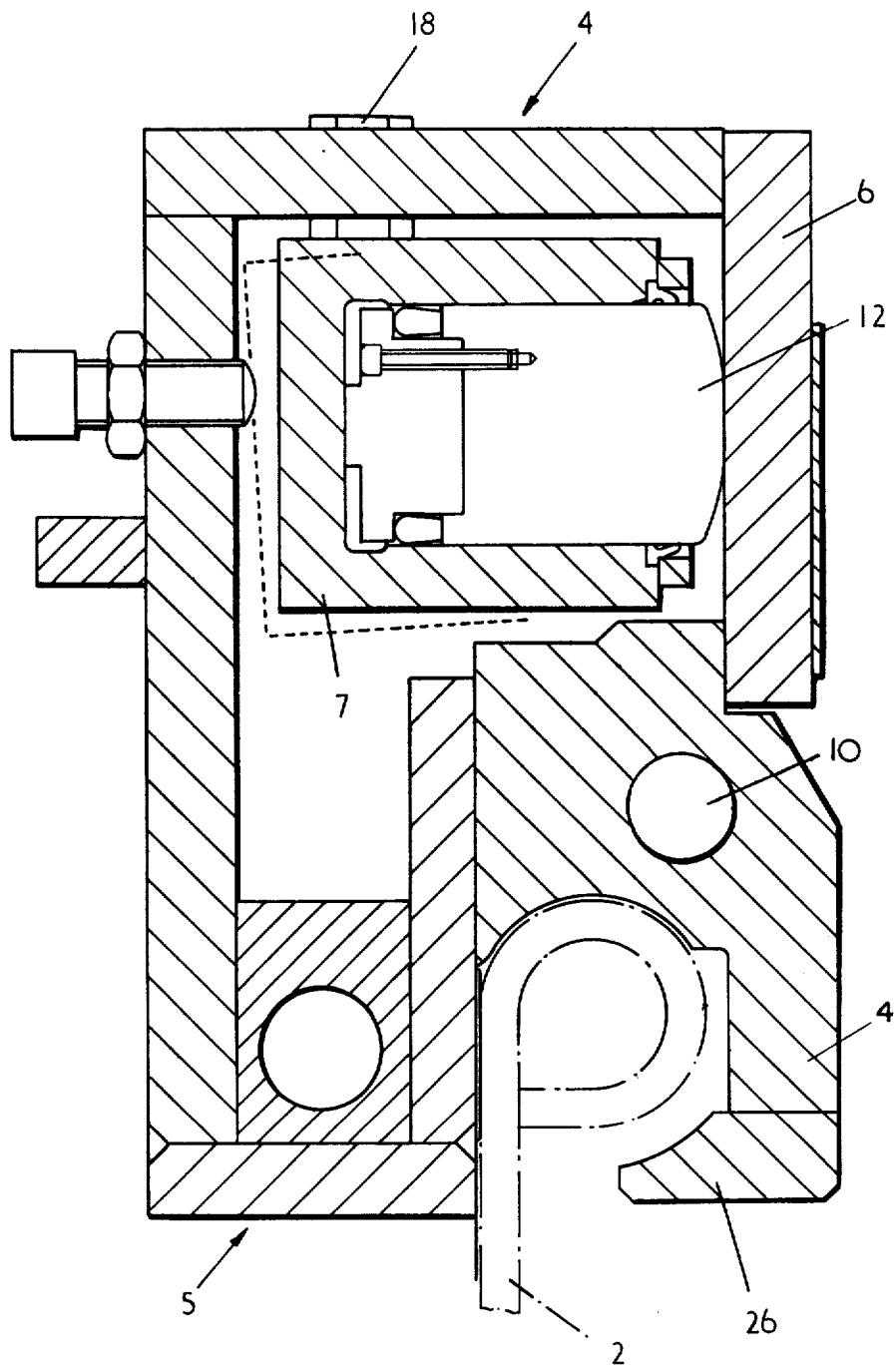
FIG. 4 is a section along line IV—IV of FIG. 1.

The brake equipment is slidable along the plate 2 and includes a wedge assembly 20 having a wedge brake pad 21 which has a series of serrations 23 along one edge adjacent to the plate 2 and which along another edge opposed to said one edge slidably contacts a wedge member 22 so that as the brake pad 21 moves relative to the remainder of brake equipment towards the left as seen in FIG. 2 it is urged towards the plate 2. In order to ensure the coefficient of friction between the wedge member 22 and the brake pad 21 is less than between the brake pad and the plate 2, the edge of the brake pad contacting the wedge member is provided with a thin layer or film of tin or other material having a low coefficient of friction. In addition, a lubricant is applied between the wedge member 22 and the brake pad 21. In alternative arrangements the tin or other material is provided on the brake pad edge adjacent to the wedge member. The brake pad 21 is urged out of contact with the plate 2 by coil springs 24 and 25. The spring 25 acts to retain the brake pad 21 in contact with the wedge member 22 while the spring 24 acts to urge the brake pad into contact with an abutment stop 27.

A bore 30 in the wedge member 22 permits the brake pad 21 to move without contacting the spring 25.

The operation of the braking system will now be described.

The brake equipment is mounted on the anchored elongated tube or rail and is fixedly attached to the machine. The pressure fluid supply is then connected to the inlet 18. The bolt 16 is then adjusted until the springs 14 urge the wedge pad 21 and the jaw 8 of the clamp to grip the member with a desired thrust sufficient to prevent the stationary machine running away down the incline but with a sufficiently small force to allow the rams 12 when energised with pressure fluid, to release the brake equipment 8, 21 from the rail or tube.

Pressure fluid is supplied from a pump (not shown) which also supplies fluid for the hydraulic steering system of the machine, i.e. for the rams which vertically adjust the cutting horizon of the machine.

The pump fluid is fed to a relay valve which is spring-loaded into the closed position, and a solenoid control valve which is also spring-loaded into the closed position and which is sensitive to the haulage force applied to the machine. The control valve receives an electric supply from a gate end box i.e. a switch panel situated remote from the machine, the supply being controlled by a switch in a load cell sensitive to the haulage chain tension. The electric supply is received by the control valve when there is tension in the chain along which the machine is hauling itself. Alternatively, or in addition, the load cell may be arranged to switch off the electric supply if the tension in the chain were to exceed a preselected load. When the valves are in the non-operating or closed position the downstream parts of the circuit are connected to exhaust.

Pressure fluid is fed downstream from the valve to the inlet 18 of the brake equipment and to the rams 12.

When the machine starts to haul itself along the chain, a signal is fed from the gate end box to the solenoid control valve causing the valve to move to the operating position and allow pressure fluid to be fed to the end of the relay valve which consequently moves to its operating position allowing fluid to be fed to the rams 12 which are thus energised and extend to release the brake equipment from the elongated member. The machine is thus free to move along the conveyor.

If during operation the chain should break, the pilot circuit will be interrupted thus removing electrical power from the machine and the solenoid control valve. This allows fluid to exhaust from the downstream part of the circuit and the rams 12 are de-energised allowing the springs 14 to apply the brake shoe 9. This operation takes place very rapidly. As soon as the brake wedge pad 21 abuts the plate 2 the wedge brake pad 21 which has a serrated plate-engaging surface (not shown) tends to remain stationary on the anchored plate 2 allowing the remainder of the brake equipment to move with the machine. However, upon a further slight movement of the brake equipment the wedge brake pad 21 slides along the wedge member 22 and the wedge assembly 20 urges the brake pad 21 towards the plate 2. Thus the brake pads are urged to grip the plate or rail and the machine is brought to rest by the braking equipment very quickly, i.e. before the machine is able to run away. Further, if in operation the haulage chain tension is excessive the pilot circuit is interrupted in a similar manner to that described above, and the brake is applied in a similar manner to the operation under chain breakage.

I claim:

1. Brake equipment for a vehicle which is in use moves along a path adjacent to an anchored rail, comprising a number of co-acting brake elements slidable along the rail, resilient means for urging at least one of the brake elements into contact with the rail and fluid actuated means for urging the said brake element out of braking contact with the rail, at least one of the brake elements including a wedge assembly having a brake pad which upon contacting the rail is urged by relative movement of wedge components in the wedge assembly to increase the braking force of the brake equipment on the rail, wherein the brake equipment comprises a first relatively moveable jaw and a second relatively fixed jaw for contacting the rail, and wherein the relatively fixed jaw includes the wedge assembly and wherein the first and second jaws are mounted on opposite sides of the rail.

2. Brake equipment for a vehicle which is in use moves along a path adjacent to an anchored rail, comprising a number of co-acting brake elements slidable along the rail, resilient means for urging at least one of the brake elements into contact with the rail and fluid actuated means for urging the said brake element out of braking contact with the rail, at least one of the brake elements including a wedge assembly having a brake pad which upon contacting the rail is urged by relative movement of wedge components in the wedge assembly to increase the braking force of the brake equipment on the rail, wherein the number of coacting brake elements comprise a brake frame moveable along a rail, a pivot connected to the frame and mounted parallel to the rail, a first jaw member mounted on the pivot for relative movement to the frame and transversely to the rail, actuator means including said resilient means connected to the first jaw and to the frame for moving the first jaw into contact with the rail, and a second jaw connected to the frame and including said wedge assembly and said brake pad for contacting the rail opposite the first jaw.

3. Equipment as claimed in claim 1 in which one of said wedge components is resiliently mounted to reverse along the rail with respect to the remainder of the brake equipment.

4. Equipment as claimed in claim 3, in which the rail contacting edge of the brake pad has a series of serrations for contacting the rail.

5. Equipment as claimed in claim 3, in which at least one of the co-acting edges of the wedge assembly has affixed thereto a layer of material having a low coefficient of friction.

6. The brake equipment of claim 1 wherein the brake pad is resiliently mounted with respect to the remainder of the brake equipment by a spring connected to the brake equipment and to the brake pad for urging the brake pad in a non-braking direction along the wedge assembly and along the rail.

7. The brake equipment of claim 2 wherein the actuator means comprises spring means urging the first jaw to move about the pivot into contact with the rail, and wherein the fluid actuated means operates to compress the spring means.

8. The brake equipment of claim 7 wherein the spring means comprises a plurality of spring washers in a recess in the first jaw, a pin within the recess extending through the washers and having a head contacting an outermost spring washer, and an adjustable abutment connected to the frame and contacting the head of the pin for causing the head push the spring washers into the recess, urging the first jaw into contact with the rail.

9. The apparatus of claim 8 wherein the fluid actuated means comprises parallel rams mounted on opposite sides of the spring washers parallel to the pin and contacting the frame and first jaw for rotating the first jaw about the pivot opposite to the spring washers.

10. Brake equipment for a vehicle which is in use moves along a path adjacent to an anchored rail, comprising a number of co-acting brake elements slidable along the rail, resilient means for urging at least one of the brake elements into contact with the rail and fluid actuated means for urging the said brake element out of braking contact with the rail, at least one of the brake elements including a wedge assembly having a brake pad which upon contacting the rail is urged by relative movement of wedge components in the wedge assembly to increase the braking force of the brake equipment on the rail, wherein the rail comprises a curved portion and a flat portion opposite the curved portion, wherein the brake pad contacts the flat portion and wherein another of the brake shoes is mounted opposite the brake pad and has a curved surface for contacting the curved portion of the rail and for urging the flat portion of the rail and the brake pad into contact.

11. A brake for a vehicle which in use moves along a path adjacent to an anchored elongated member, comprising a casing securable to the vehicle, two jaws for clamping the elongated member when the brake is applied, the jaws being fixed with respect to the casing in the direction of vehicle movement, pivotal mounting means connected to the casing and jaws and connecting the jaws for relative pivotal movement when the brake is applied and released, resilient means connected to the casing and jaws for urging relative pivotal movement of the jaws about the pivotal mounting means to apply the brake and clamp the elongated member with an initial braking force, and fluid actuated means connected to the casing and jaws for urging said jaws to release the brake, at least one of the jaws having a wedge assembly including two co-acting wedge components, one of which comprises a brake pad for contacting the elongated member and the other of which co-acts with said first wedge component to urge the brake pad towards the elongated member, the wedge components co-acting when the brake is applied with said brake pad in contact with the elongated member and said other wedge component tending to move with the remainder of the brake, the action of the brake when applied being such that upon the brake pad contacting the elongated member said initial braking force is applied and upon said remainder of brake tending to move relative to the brake pad the wedge components are urged to co-act to increase the braking force from said initial braking force.

12. A brake as claimed in claim 11, in which at least a portion of one of the jaws is constituted by a part of the side of the casing.

13. A brake as claimed in claim 12, in which said one wedge component is resiliently mounted with respect to the remainder of the brake.

14. A brake as claimed in claim 13, in which the brake pad has a series of serrations for contacting the elongated member.

15. A brake as claimed in claim 14, in which at least one of the co-acting wedge components of the wedge assembly has a layer of material having a low coefficient of friction.

* * * * *